(12) United States Patent
Nakabe (10) Patent No.: US 10,713,032 B2
(45) Date of Patent: Jul. 14, 2020

(54) FIRMWARE UPDATE SYSTEM, SERVER, AND ELECTRONIC DEVICE

(71) Applicant: Onkyo Corporation, Neyagawa-shi (JP)

(72) Inventor: Takashi Nakabe, Neyagawa (JP)

(73) Assignee: ONKYO CORPORATION, Osaka (JP)

(*) Notice: Subject to any disclaimer, the term of this patent is extended or adjusted under 35 U.S.C. 154(b) by 108 days.

(21) Appl. No.: 15/812,339

(22) Filed: Nov. 14, 2017

(65) Prior Publication Data

US 2018/0136925 A1     May 17, 2018

(30) Foreign Application Priority Data

Nov. 14, 2016   (JP) .................................. 2016-221369

(51) Int. Cl.
*G06F 8/65*       (2018.01)
*H04L 29/12*      (2006.01)
(Continued)

(52) U.S. Cl.
CPC .................. *G06F 8/65* (2013.01); *G06F 8/71* (2013.01); *H04L 61/6022* (2013.01); *H04L 67/34* (2013.01)

(58) Field of Classification Search
CPC ......... G06F 8/65; G06F 8/71; H04L 61/6022; H04L 67/34
(Continued)

(56) References Cited

U.S. PATENT DOCUMENTS 7,363,480 B1 * 4/2008 Righi ........................ G06F 8/65
                                                        709/219
7,809,366 B2 * 10/2010 Rao ........................... G06F 8/65
                                                        455/419
(Continued)

FOREIGN PATENT DOCUMENTS

CN    101645801 A  *  2/2010  ............... G06F 8/65
EP       2169919 A1 *  3/2010  ......... H04N 21/4122
(Continued)

OTHER PUBLICATIONS

Chen, "A Novel Network Module for Medical Devices", 2008, IEEE (Year: 2008).*
(Continued)

*Primary Examiner* — Wei Y Zhen
*Assistant Examiner* — Junchun Wu
(74) *Attorney, Agent, or Firm* — Xsensus LLP (57) ABSTRACT

A system that includes an electronic device and a server configured to communicate via a network, and the electronic device includes first circuitry that stores firmware in a first memory of the electronic device;
sends a network address of the electronic device to the server; and updates the firmware based on an update package received from the server in response to sending the network address, and the server includes second circuitry that stores, in a second memory of the server, a plurality of network addresses of a plurality of the electronic devices, and a plurality of update packages; and sends one of the plurality of update packages to the electronic device based on the network address of the electronic device which is sent from the electronic device.

17 Claims, 4 Drawing Sheets

(51) Int. Cl.
*H04L 29/08* (2006.01)
*G06F 8/71* (2018.01)
(58) Field of Classification Search
USPC .......................................................... 717/173
See application file for complete search history.

(56) References Cited

U.S. PATENT DOCUMENTS

| | | | | |
|---|---|---|---|---|
| 7,987,449 | B1* | 7/2011 | Marolia | G06F 8/658 |
| | | | | 717/120 |
| 8,555,273 | B1* | 10/2013 | Chia | G06F 8/654 |
| | | | | 717/173 |
| 8,634,821 | B2* | 1/2014 | Raleigh | H04M 15/61 |
| | | | | 455/419 |
| 9,032,387 | B1* | 5/2015 | Hill | G06F 8/61 |
| | | | | 717/173 |
| 9,875,093 | B2* | 1/2018 | Li | G06F 8/65 |
| 2006/0080464 | A1* | 4/2006 | Kozuki | G06F 21/121 |
| | | | | 709/245 |
| 2009/0185563 | A1* | 7/2009 | Zhu | H04L 12/185 |
| | | | | 370/390 |
| 2009/0235244 | A1* | 9/2009 | Enomori | G06F 8/65 |
| | | | | 717/170 |
| 2010/0115587 | A1* | 5/2010 | Kubota | H04L 63/08 |
| | | | | 726/3 |
| 2010/0169876 | A1 | 7/2010 | Mann | |
| 2012/0030665 | A1* | 2/2012 | McCarthy | G06F 8/65 |
| | | | | 717/171 |
| 2013/0086281 | A1* | 4/2013 | Yada | G06F 8/654 |
| | | | | 709/245 |
| 2014/0208438 | A1* | 7/2014 | Li | G06F 21/60 |
| | | | | 726/27 |
| 2015/0205597 | A1 | 7/2015 | Nishikawa | |
| 2017/0039372 | A1* | 2/2017 | Koval | G01D 4/004 |

FOREIGN PATENT DOCUMENTS

| | | | |
|---|---|---|---|
| JP | 2008225965 A | * | 9/2008 |
| JP | 2009-217656 A | | 9/2009 |
| JP | 2015-69282 A | | 4/2015 |
| JP | 2015-138297 A | | 7/2015 |

OTHER PUBLICATIONS

Katzir et al., "Secure Firmware Updates for Smart Grid Devices", 2011, IEEE (Year: 2011).*
Choi et al., "Secure Firmware Validation and Update for Consumer Devices in Home Networking", 2016, IEEE (Year: 2016).*
Conradi et al., "Version Models for Software Configuration Management", Jun. 1998, ACM, vol. 30, No. 2 (Year: 1998).*

* cited by examiner

FIRMWARE UPDATE SYSTEM, SERVER, AND ELECTRONIC DEVICE

CROSS-REFERENCE TO RELATED APPLICATIONS

This application claims priority to Japanese Application No. 2016-221369, filed Nov. 14, 2016, the entire contents of which are incorporated herein by reference.

FIELD

The present disclosure relates to a firmware update system which updates firmware, a server and an electronic device composing the firmware update system.

BACKGROUND

In an electronic device such as an AV receiver, there is a device which can update firmware via a network (for example, see JP 2015-138297 A.). An update package which is for updating the firmware is provided in a server. The update packages of one kind for each model are provided in the server. There are cases where CGIs for download are prepared in separate folders for a package for real update and a package for test and cases of update are divided.

However, a package which is updated is one folder for performance. For this reason, all electronic devices perform the same access. In this case, there is possibility that a problem that server accesses are concentrated and time is needed for download occurs because timing of accesses from the electronic devices to the server is the same. Further, there may be a problem that if there may be serious bugs in a released package, the package with the bugs is spread over as the package is updated all at once.

SUMMARY

According to one aspect of the disclosure, there is provided a system, comprising: an electronic device and a server configured to communicate via a network, wherein the electronic device comprises: first circuitry configured to store firmware in a first memory of the electronic device; send a network address of the electronic device to the server; and update the firmware based on an update package received from the server in response to sending the network address, and the server comprises: second circuitry configured to store, in a second memory of the server, a plurality of network addresses of a plurality of the electronic devices, and a plurality of update packages; and send one of the plurality of update packages to the electronic device based on the network address of the electronic device which is sent from the electronic device.

DETAILED DESCRIPTION

An objective of the present disclosure is to control update of firmware by an electronic device. According to the present disclosure, update of firmware by an electronic device can be controlled.

Figure 1:
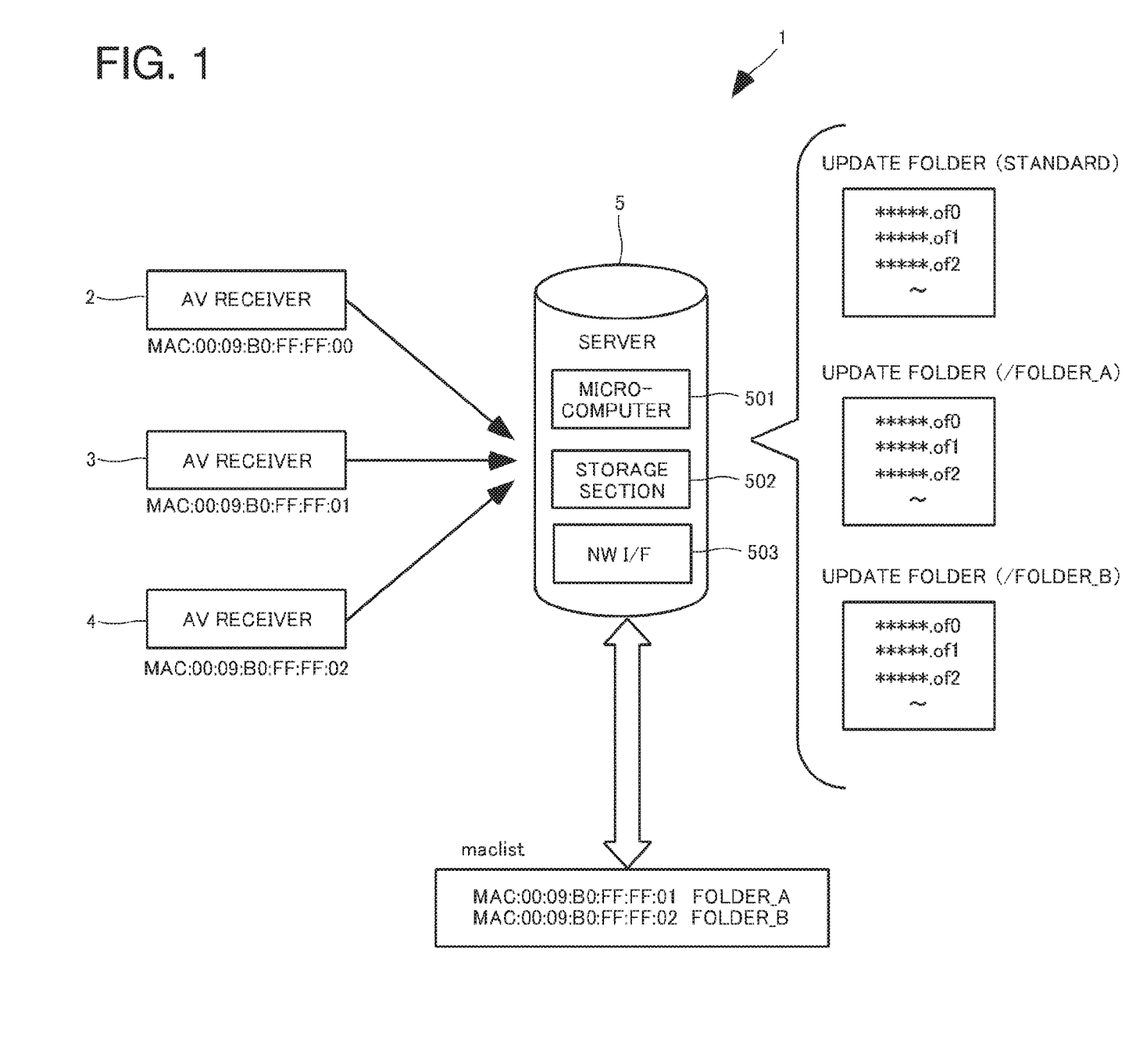
FIG. 1 is a block diagram illustrating a configuration of a firmware update system according to an embodiment of the present disclosure.

FIG. 1 is a block diagram illustrating a firmware update system 1 according to an embodiment of the present disclosure. As illustrated in FIG. 1, the firmware update system 1 includes AV receivers 2 to 4 and a server 5.

Figure 2:
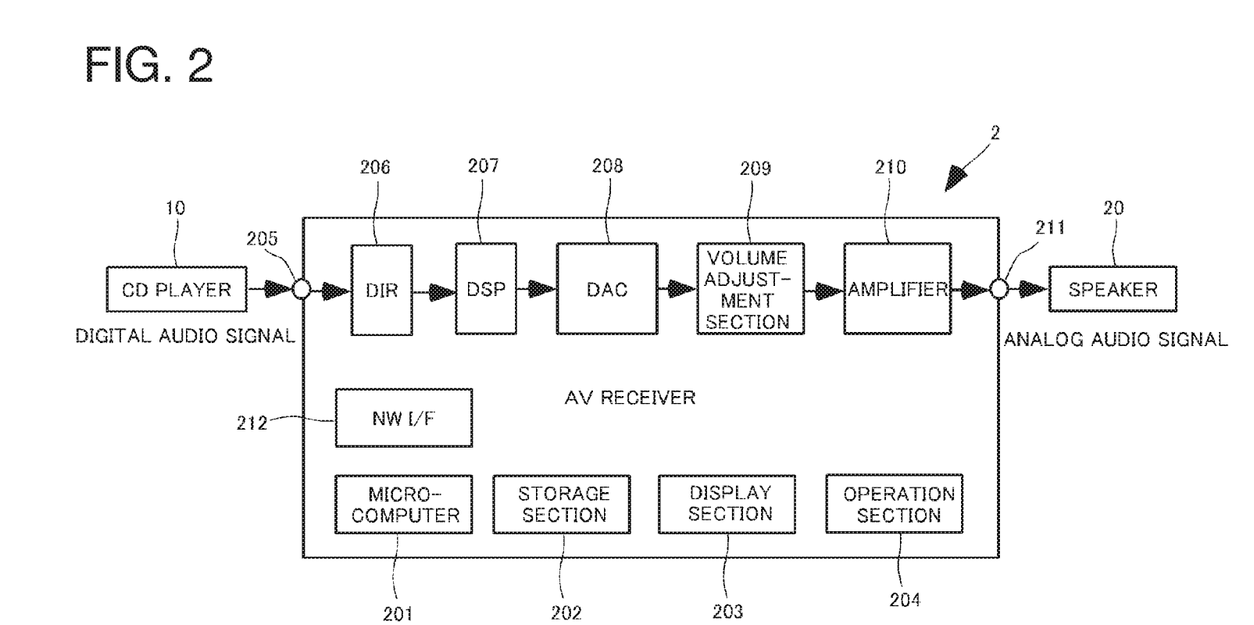
FIG. 2 is a block diagram illustrating a configuration of an AV receiver.

FIG. 2 is a block diagram illustrating the AV receiver 2. The AV receivers 2 to 4 are the same configuration. For this reason, only the AV receiver 2 is described. For example, the AV receiver 2 (electronic device) performs audio processing such as amplification to an audio signal which is output from a CD player and outputs the audio signal to the speaker 20.

As illustrated in FIG. 2, the AV receiver 2 includes a microcomputer 201, a storage section 202, a display section 203, an operation section 204, a digital signal input terminal 205, a DIR (Digital Interface Receiver) 206, a DSP (Digital Signal Processor) 207, a D/A converter (hereinafter referred as to "DAC") 208, a volume adjustment section 209, an amplifier 210, a speaker terminal 211, and a network interface (hereinafter referred as to "NW I/F") 212.

The microcomputer 201 (first circuitry, first controller) is composed of hardware such as a CPU (Central Processing Unit), a ROM (Read Only Memory) and a RAM (Random Access Memory). The CPU controls respective sections composing the AV receiver 2 according to a program which is stored in the ROM. The RAM functions as a main memory of the CPU. The ROM stores a program. The storage section 202 (first circuitry, first storage section) stores firmware.

The display section 203 displays setting screen and so on, and is an LCD (Liquid Crystal Display) and a vacuum fluorescent display. The operation section 204 is for receiving user operation and is operation buttons which are provided at an enclosure of AV receiver and a remote controller. For example, a user can direct a volume value of an audio signal by operating the operation section 204.

The CD player 10 is connected to the digital signal input terminal 205. An SPDIF signal is input to the digital signal input terminal 205 from the CD player 10. The DIR 206 converts the SPDIF signal which is input from the CD player 10 into an I2S signal. The converted I2S signal is output to the DSP 207. The DSP 207 performs digital signal processing such as equalizer processing on the I2S signal. The I2S signal subjected to the digital signal processing is output to the DAC 208. The DAC 208 D/A-converts the I2S signal into an analog audio signal. The D/A-converted analog audio signal is output to the volume adjustment section 209.

The volume adjustment section 209 adjusts a volume value of the analog audio signal. The analog audio signal that volume value is adjusted is output to the amplifier 210. The amplifier 210 amplifies the analog audio signal that volume value is adjusted. The amplified analog audio signal is output to the speaker terminal 211. The speaker 20 is connected to the speaker terminal 211. The speaker 20 outputs an audio based on the analog audio signal.

The NW I/F 212 is for communicating with an external device via a network. The CPU 201 communicates with the external device (the server 5) via the network by the NW I/F 212.

The server 5 includes a microcomputer 501, a storage section 502, and a network interface (hereinafter referred as to "NW I/F") 503. The microcomputer 501 (second circuitry, second controller) is composed of hardware such as a CPU, a RAM, and a ROM. The CPU controls respective sections composing the server 5 according to a program which is stored in the ROM. The RAM functions as a main memory of the CPU. The ROM stores a program. The storage section 502 (second circuitry, second storage section) stores update packages and MAC addresses (network addresses). The NW I/F 503 is for communicating with an external device via the network. The CPU 501 communicates with external devices (the AV receivers 2 to 4) via the network by the NW I/F 503.

For example, the microcomputer 201 of the AV receiver 2 updates the firmware based on a notice from the server 5. When the microcomputer 201 updates the firmware, it confirms the user whether the user agrees with privacy policy or not. For example, the microcomputer 201 makes an OSD (On Screen Display) which is for confirming whether the user agrees with privacy policy or not and displays the OSD on a television device. The microcomputer 201 receives a direction on whether the user agrees with privacy policy or not via the operation section 204. Herein, agreeing with privacy policy includes agreeing with sending the MAC address of the AV receiver 2 to the server 5. When the microcomputer 201 receives a direction that the user agrees with privacy policy, it sends version information of the firmware and the MAC address of the AV receiver 2 to the server 5. For example, the MAC address of the AV receiver 2 is 00:09:B0:FF:FF:00. For example, the MAC address of the AV receiver 3 is 00:09:B0:FF:FF:01. For example, the MAC address of the AV receiver 4 is 00:09:B0:FF:FF:02.

When the microcomputer 201 receives a direction that the user does not agree with privacy policy, it does not send the MAC address of the AV receiver 2. In this case, the microcomputer 201 sends version information of the firmware and predetermined MAC address which is different from the MAC address of the AV receiver 2 to the server 5. For example, the predetermined MAC address is 00:09:B0:00:00:00.

Herein, for example, download request to the server from the AV receiver 2 is performed with the below URL. http://avrupd.onkyo.com/release/cgi/download_mac_filter-.cgi ?hwaddr=&filename= The MAC address of the AV receiver 2 is written in "hwaddr=". Further, name of the firmware to update is written in "filename=". A conventional AV receiver which does not send the MAC address accesses download.cgi. Namely, in the present embodiment, download.cgi is replaced to download_mac_filter.cgi.

First Embodiment

When the microcomputer 501 of the server 5 receives the MAC addresses which are sent from the AV receivers 2 to 4 by the NW I/F 503, it sends the update packages to the AV receivers 2 to 4 based on the MAC addresses which are sent from the AV receivers 2 to 4. For example, the microcomputer 501 does not send the update packages to the AV receivers 2 to 4 which send the predetermined MAC address (00:09:B0:00:00:00). Further, the microcomputer 501 sends the update packages to the AV receivers 2 to 4 which send the MAC address (00:09:B0:FF:FF:00 or the like) other than the predetermined MAC address. Thus, it is possible to suppress access to the server 5 from the AV receivers 2 to 4.

Second Embodiment

The MAC address and folder information in which an update package is stored are stored in the storage section 502 of the server 5 in association with each other (maclist). As illustrated in FIG. 1, the MAC address 00:09:B0:FF:FF:01 is in association with folder information FOLDER_A. Further, MAC address 00:09:B0:FF:FF:02 is in association with folder information FOLDER_B. Different update packages are stored in the folder of FOLDER_A and the folder of FOLDER_B.

When the microcomputer 501 of the server 5 receives the MAC addresses which are sent from the AV receivers 2 to 4 by the NW I/F 503, it sends the update packages to the AV receivers 2 to 4 based on the MAC addresses which are sent from AV receivers 2 to 4. Herein, the microcomputer 501 sends the update packages to the AV receiver 2 to 4 based on maclist that the MAC address and folder information stores update package are in association.

For example, when the received MAC address is 00:09:B0:FF:FF:01, the microcomputer 501 sends the update package which is stored in the folder of FOLDER_A which is in association with the MAC address 00:09:B0:FF:FF:01 to the AV receiver 3. Further, when the received MAC address is 00:09:B0:FF:FF:02, the microcomputer 501 sends the update package which is stored in the folder of FOLDER_B which is in association with the MAC address 00:09:B0:FF:FF:02 to the AV receiver 4. Further, when the received MAC address is 00:09:B0:FF:FF:00, the microcomputer 501 sends the update package which is stored in a folder of default to the AV receiver 2 because the MAC address 00:09:B0:FF:FF:00 is not included in maclist. Further, the received MAC address is the predetermined MAC address 00:09:B0:00:00:00, the microcomputer 501 sends the update package which is stored in the folder of default to the AV receiver 2 because the MAC address 00:09:B0:00:00:00 is not included in maclist.

Herein, in registration information of maclist, both of individual designation and area designation can be adopted. In case of individual designation, designation is performed by [MAC address] [designation folder]. For example, designation is performed by 00:09:B0:FF:FF:01 FOLDER_A. Further, designation is performed by 00:09:B0:FF:FF:02 FOLDER_B. In the case of area designation, designation is performed by [MAC address/MAC address] [designation folder]. For example, designation is performed by 00:09:B0:FF:FE:00/00:09:B0:FF:FE:FF FOLDER_B. In this case, the AV receiver of which the MAC address in included in 00:09:B0:FF:FE:00/00:09:B0:FF:FE:FF is a target of an update package stored in the folder of FOLDER_B.

In the second embodiment, the microcomputer 501 sends the update packages which correspond to the MAC addresses which are sent from the AV receivers 2 to 4. Thus, the update package which is sent can be changed based on the MAC address. For example, as the update packages, a standard update package and specific update packages (update packages which are stored in folders of FOLDER_A and B) are included.

Figure 3:
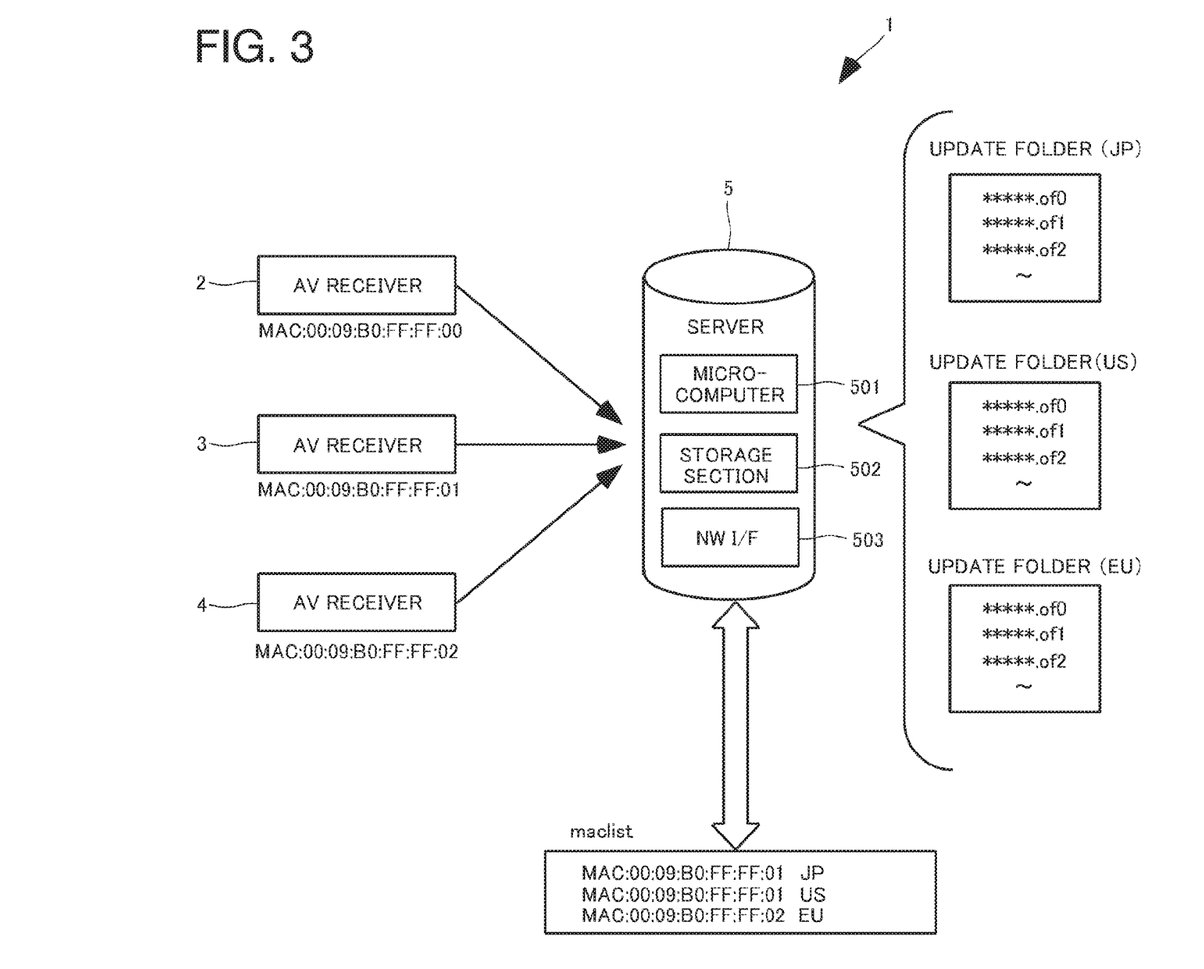
FIG. 3 is a block diagram illustrating a configuration of a firmware update system according to an embodiment of the present disclosure.

Further, the update packages may include update packages which are different in destination. In this case, different update packages are sent to destination of the AV receivers 2 to 4. For example, as illustrated in FIG. 3, the MAC address 00:09:B0:FF:FF:00 is in association with a folder (JP) which stores an update package of destination to Japan (JP). Further, the MAC address 00:09:B0:FF:FF:01 is in association with a folder (US) which stores an update package of destination to the United states (US). Further, the MAC address 00:09:B0:FF:FF:02 is in association with a folder (EU) which stores an update package of destination to Europe (EU).

When the received MAC address is 00:09:B0:FF:FF:00, the microcomputer 501 sends the update package which is stored in the folder JP of destination to Japan to the AV receiver 2. When the received MAC address is 00:09:B0:FF:FF:01, the microcomputer 501 sends the update package which is stored in the folder US of destination to the United States to the AV receiver 3. When the received MAC address is 00:09:B0:FF:FF:02, the microcomputer 501 sends the update package which is stored in the folder EU of destination to Europe to the AV receiver 3.

Further, the update packages may include a paid update package and a free update package. In this case, the free or the paid update package is sent according to the AV receivers 2 to 4. For example, the free update package is stored in a default folder. Further, the paid update package is stored in a folder of FOLDER_A. Further, a paid update package which is different from the paid update package which is stored in the folder of FOLDER_A is stored in a folder of FOLDER_B. The microcomputer 201 of the AV receiver 2 receives accounting to the paid update package and sends the information to the server 5. The microcomputer 501 of the server 5 makes maclist according to the accounting information.

Further, the microcomputer 501 of the server 5 may send the update package to the AV receiver 2 of the predetermined number (for example, half number of target models) based on the MAC addresses which are sent from the AV receivers 2 to 4. In this case, for example, the MAC address of the AV receiver 2 of firmware update target is registered in maclist. Like this, by sending the update packages to update target models of the predetermined number, access from the AV receivers 2 to 4 to the server 5 can be suppressed. Further, by setting target number to 1->50->100%, delivery of the update packages can be controlled. Further, when the update package has bug, the update package is prevented from being sent to all of target models.

When the microcomputer 201 of the AV receiver 2 receives the update package from the server 5 by the NW I/F 212, it updates firmware which is stored in the storage section 202 based on the received update package.

Figure 4:
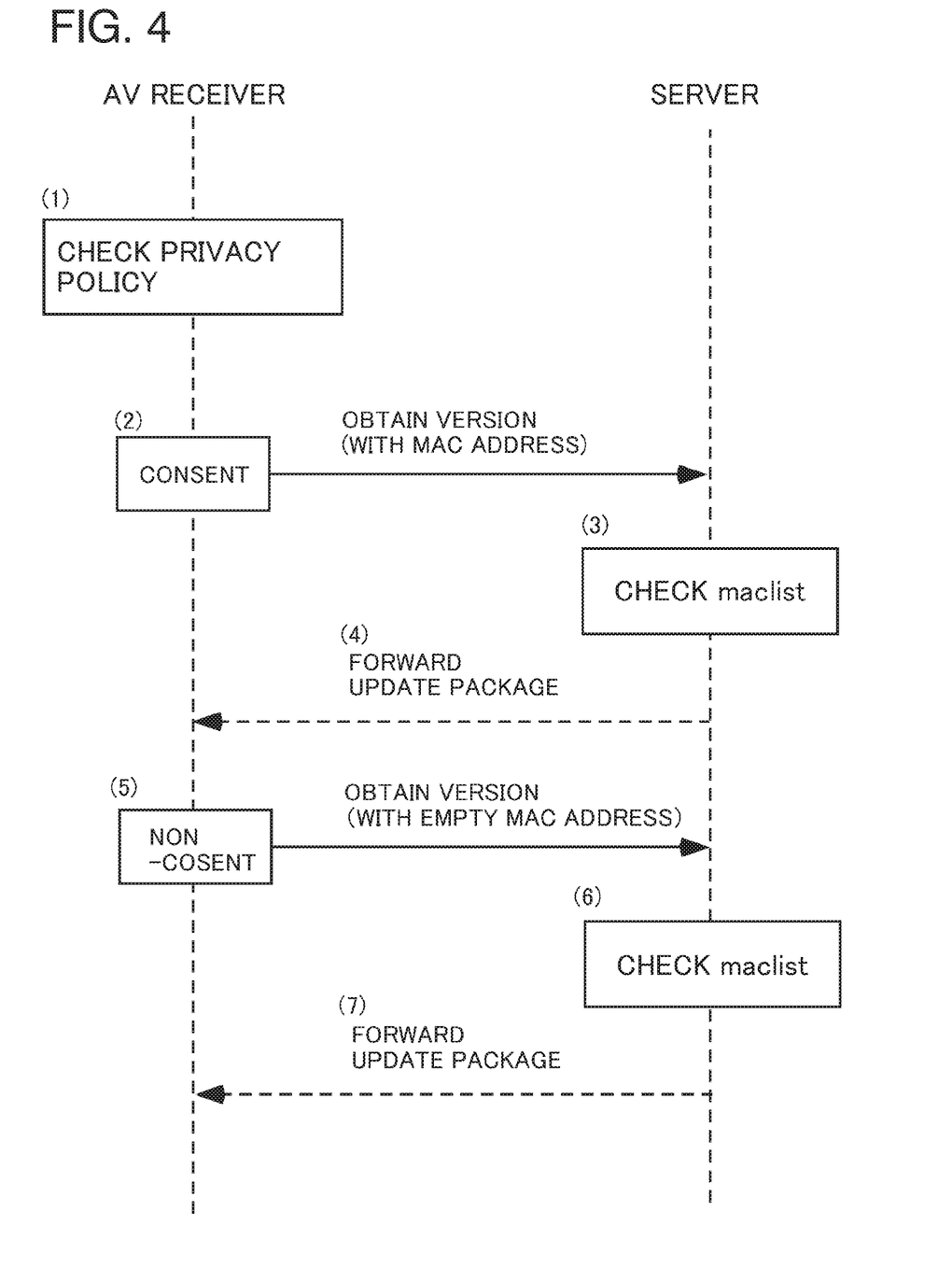
FIG. 4 is a sequence diagram illustrating processing operation of the firmware update system in case where firmware is updated.

FIG. 4 is a sequence diagram illustrating processing operation of the firmware update system 1 in case where firmware is updated. As illustrated in FIG. 4, the microcomputer 201 of the AV receiver 2 checks that a user consents to privacy policy exists or not (1). When the user consents to privacy policy exists, the microcomputer 201 sends firmware version information with the MAC address to the server 5 (2).

When the microcomputer 501 of the server 5 obtains the firmware version information with the MAC address, it checks maclist (3). When the MAC address of a parameter exists in a registered list, the microcomputer 501 changes a read folder from the folder of default (standard). And, the microcomputer 501 forwards an update package which is stored in a changed folder to the AV receiver 2 (4).

Meanwhile, when a user consents to privacy policy does not exist, the microcomputer 201 sends the firmware version information with an empty MAC address to the server 5 (5). When the microcomputer 501 of the server 5 obtains the firmware version information with the MAC address, it checks maclist (6). Herein, the MAC address is empty and it is not registered in the list. For this reason, the microcomputer 501 selects the folder of default (standard). And, the microcomputer 501 forwards the update package which is stored in the folder of default to the AV receiver 2 (7).

As described in the above, in the present embodiment, the microcomputer 501 of the server 5 sends the update packages to the AV receivers 2 to 4 based on the MAC addresses which are sent from the AV receivers 2 to 4. For example, the microcomputer 501 sends the update package to half of the update target models based on the MAC address. Thus, access from the AV receivers 2 to 4 to server 5 can be suppressed. Like this, according to the present embodiment, update of the firmware by the AV receivers 2 to 4 can be controlled.

Further, in the present embodiment, the microcomputer 201 of the AV receiver 2 does not send the MAC address to the server 5 when it receives setting of sending non-permission of the MAC address (non-consent to privacy policy). Thus, when the user does not want to send the MAC address to the server 5, the user can set not to send MAC address by setting the sending non-permission of the MAC address.

Further, in the present disclosure, the microcomputer 501 of the server 5 sends the update packages which correspond to the MAC addresses which are sent from the AV receivers 2 to 4. Thus, the update package which is sent can be changed based on the MAC address.

The embodiment of the present disclosure is described above, but the mode to which the present disclosure is applicable is not limited to the above embodiment and can be suitably varied without departing from the scope of the present disclosure.

In the above mentioned embodiment, MAC address is illustrated as network address. Not limited to this, the network address may be IP address.

In the above mentioned embodiment, the AV receivers 2 to 4 are illustrated as an electronic device. Not limited to this, other electronic devices which include firmware may be adopted.

The present disclosure can be suitably employed in a firmware update system which updates firmware, a server and an electronic device composing the firmware update system.

The invention claimed is:

1. A system, comprising:
an electronic device and a server configured to communicate via a network, wherein
the electronic device comprises:
first circuitry configured to
store firmware in a first memory of the electronic device;
receive an input regarding a setting of the electronic device, the setting being either a first setting where sending a network address of the electronic device from the electronic device to the server is permitted, or a second setting where sending the network address from the electronic device to the server is not permitted;
send version information of the firmware with the network address of the electronic device to the server in a case where the setting of the electronic device is the first setting;
send the version information of the firmware with an empty network address to the server in a case where the setting of the electronic device is the second setting; and
update the firmware based on an update package received from the server in response to sending the version information, and
the server comprises:
second circuitry configured to
store, in a second memory of the server, a plurality of network addresses of a plurality of the electronic devices, and a plurality of update packages;
identify one of the plurality of update packages corresponding to the network address of the electronic device which is sent from the electronic device, and send the identified update package to the electronic device in a case where the network address of the electronic device is sent from the electronic device with the version information; and send a default update package to the electronic device in a case where the empty network address is sent from the electronic device with the version information.

2. The system according to claim 1, wherein the second circuitry is configured to send the update packages to a predetermined number of the plurality of electronic devices based on network addresses sent from each of the plurality of electronic devices.

3. The system according to claim 1, wherein the first circuitry is configured to send, as the empty network address, a predetermined network address which is different from the network address of the electronic device in the case where the setting of the electronic device is the second setting.

4. The system according to claim 1, wherein the second circuitry is configured to:

store, in the second memory, the plurality of network addresses and the plurality of update packages which correspond to the plurality of network addresses in association with each other; and send, to the electronic device, one of the plurality of update packages corresponding to the network address sent from the electronic device.

5. The system according to claim 1, wherein at least part of the plurality of update packages differ from each other according to a destination of each of the plurality of electronic devices.

6. The system according to claim 1, wherein the plurality of update packages include a paid update package.

7. The system according to claim 1, wherein the network address is a MAC (Media Access Control) address.

8. A server, comprising:
circuitry configured to
store, in a memory of the server, a plurality of network addresses of a plurality of electronic devices, and a plurality of update packages; and send one of the plurality of the update packages to one of the plurality of electronic devices based on the network address of the one of the plurality of electronic devices which is sent from the one of the plurality of electronic devices,. wherein the one of the plurality of electronic devices is configured to:

receive an input regarding a setting of the one of the plurality of electronic devices, the setting being either a first setting where sending the network address of the one of the plurality of electronic devices from the one of the plurality of electronic devices to the server is permitted, or a second setting where sending the network address of the one of the plurality of electronic devices from the one of the plurality of electronic devices to the server is not permitted; and send version information of firmware of the one of the plurality of electronic devices with the network address of the one of the plurality of electronic devices to the server in a case where the setting of the one of the plurality of electronic devices is the first setting, another of the plurality of electronic devices is configured to:

receive an input regarding a setting of the another of the plurality of electronic devices, the setting being either the first setting where sending the network address of the another of the plurality of electronic devices to the server is permitted, or the second setting where sending the network address of the another of the plurality of electronic devices to the server is not permitted; and send version information of firmware of the another of the plurality of electronic devices with an empty network address to the server in a case where the setting of the another of the plurality of electronic devices is the second setting, and the circuitry is further configured to identify one of the plurality of update packages corresponding to the network address of the one of the plurality of electronic devices which is sent from the one of the plurality of electronic devices, and send the identified update package to the one of the plurality of electronic devices; and send a default update package to the another of the plurality of electronic devices.

9. The server according to claim 8, wherein the circuitry is configured to send the update packages to predetermined number of the plurality of electronic devices based on a network address sent from each of the plurality of electronic devices.

10. The server according to claim 8, wherein the circuitry is configured to:

store, in the memory, the plurality of network addresses and the plurality of update packages which correspond to the plurality of network addresses in association with each other; and send, to the electronic device, one of the plurality of update packages corresponding to the network address sent from the electronic device.

11. The server according to claim 8, wherein at least part of the plurality of update packages differ from each other according to a destination of each of the plurality of electronic devices.

12. The server according to claim 8, wherein the plurality of update packages include a paid update package.

13. The server according to claim 8, wherein the network address is a MAC (Media Access Control) address.

14. An electronic device, comprising:
circuitry configured to
store firmware in a memory of the electronic device;
receive an input regarding a setting of the electronic device, the setting being either a first setting where sending a network address of the electronic device from the electronic device to the server is permitted, or a second setting where sending the network address from the electronic device to the server is not permitted;

send version information of the firmware with the network address of the electronic device to a server in a case where the setting of the electronic device is the first setting;

send the version information of the firmware with an empty network address to the server in a case where the setting of the electronic device is the second setting; and update the firmware based on an update package received from the server in response to sending the version information.

15. The electronic device according to claim 14, wherein the circuitry is configured to send, as the empty network address, a predetermined network address which is different from the network address of the electronic device in the case where the setting of the electronic device is the second setting.

16. A system, comprising:
an electronic device and a server configured to communicate via a network, wherein the electronic device comprises:
a first controller configured to
  store firmware in a first storage section of the electronic device;
  receive an input regarding a setting of the electronic device, the setting being either a first setting where sending a network address of the electronic device from the electronic device to the server is permitted, or a second setting where sending the network address from the electronic device to the server is not permitted;
  send version information of the firmware with the network address of the electronic device to the server in a case where the setting of the electronic device is the first setting;
  send the version information of the firmware with an empty network address to the server in a case where the setting of the electronic device is the second setting; and
  update the firmware based on an update package received from the server in response to sending the network address version information, and
the server comprises:
a second controller configured to
  store, in a second storage section of the server, a plurality of network addresses of a plurality of the electronic devices, and a plurality of update packages;
  identify one of the plurality of update packages corresponding to the network address of the electronic device which is sent from the electronic device, and send the identified update package to the electronic device in a case where the network address of the electronic device is sent from the electronic device with the version information; and
  send a default update package to the electronic device in a case where the empty network address is sent from the electronic device with the version information.

17. The system according to claim 1, wherein
the first circuitry is configured to receive the input regarding the setting of the electronic device when the firmware is updated.

* * * * *